Figure 1:
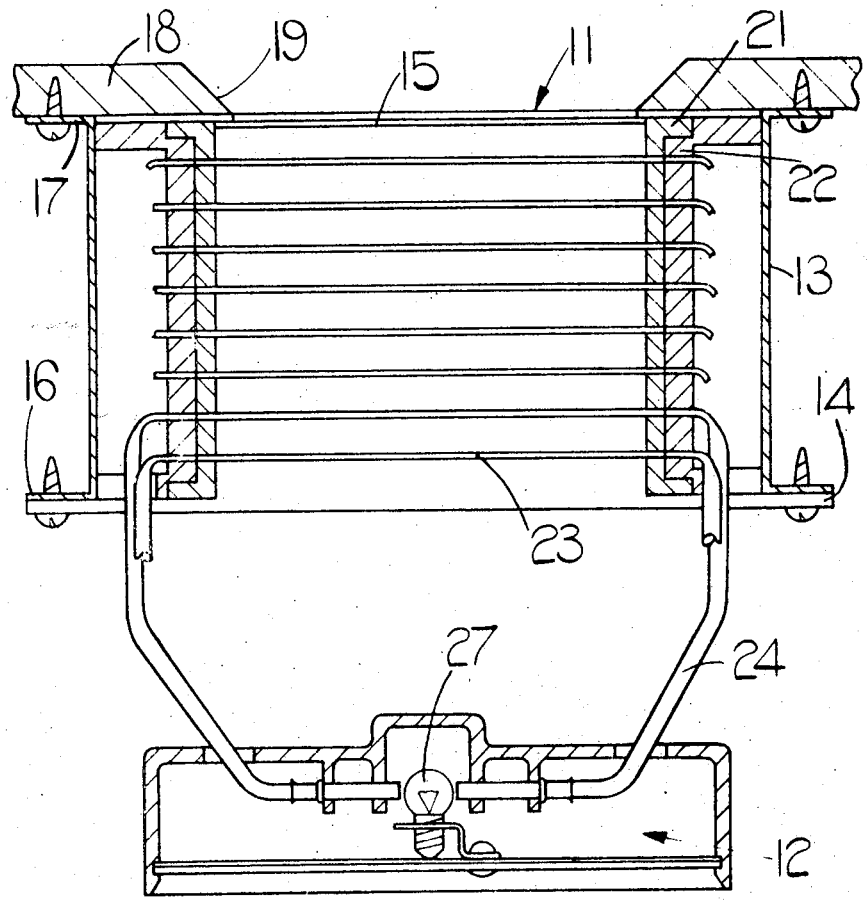

United States Patent [19]

Werda

[11] 3,728,673
[45] Apr. 17, 1973

[54] FAULT DISPLAY UNIT FOR A VEHICLE

[76] Inventor: Konrad Werda, 34 Peel Park Avenue., Clitheroe, England

[22] Filed: July 27, 1971

[21] Appl. No.: 166,440

[30] Foreign Application Priority Data

Aug. 8, 1970 Great Britain.....................38,346/70

[52] U.S. Cl. ..............................340/52 F, 340/380
[51] Int. Cl. ..............................B60q 1/00
[58] Field of Search.................340/52 R, 52 D, 52 E, 340/52 F, 59, 244, 380

[56] References Cited

UNITED STATES PATENTS

| | | | |
|---|---|---|---|
| 3,384,885 | 5/1968 | Forbush | 340/59 X |
| 3,588,811 | 6/1971 | Prickett | 340/52 E |

*Primary Examiner*—Alvin H. Waring
*Attorney*—Holman & Stern

[57] ABSTRACT

A fault display unit for a vehicle includes a casing having an aperture at one end thereof and a plurality of translucent display panels mounted in the casing in parallel, spaced relationship with said one end of the casing. A plurality of optical cables are associated with said display panels respectively, one end of each optical cable being positioned adjacent a respective display panel so that light from the optical cable, in use, illuminates the display panel. Each of the display panels is formed with a plurality of indentations in the surface thereof remote from the aperture in the casing, and each of the indentations includes a surface for reflecting some of the light from a respective optical cable, in use, towards the aperture in the casing. The indentations in each display panel are arranged to define a legend so that when a display panel is illuminated an image of the respective legend is produced in the aperture.

7 Claims, 3 Drawing Figures

PATENTED APR 17 1973 3,728,673

INVENTOR
Konrad Werda

ATTORNEYS

FAULT DISPLAY UNIT FOR A VEHICLE

This invention relates to a fault display unit for a vehicle.

A unit, according to the invention, includes a casing having an aperture at one end thereof, a plurality of translucent display panels mounted in the casing in parallel, spaced relationship with said one end of the casing, and a plurality of optical cables associated with said display panels respectively, one end of each optical cable being positioned adjacent a respective display panel so that light from the optical cable, in use illuminates the display panel, each of said display panels being formed with a plurality of indentations in the surface thereof remote from the aperture in the casing, and each of said indentations including a surface for reflecting some of the light from a respective optical cable, in use, towards said aperture in the casing, the indentations in each display panel being arranged to define a legend so that when a display panel is illuminated an image of the respective legend is produced in the aperture.

Preferably, each display panel is illuminated in use by a pair of optical cables positioned at their one end at opposite sides respectively of the display panel.

The invention further resides in a fault display system incorporating the fault display unit described above and further including a control unit for controlling illumination of the optical cables in use, the system being arranged so that when a fault occurs in the vehicle in use one of said plurality of optical cables is illuminated whereby a respective display panel is also illuminated and an image of the legend carried by the display panel is produced in said aperture so as to give warning of the fault to the driver of the vehicle.

Figure 2:
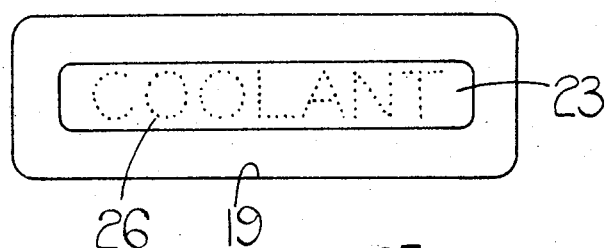
Figure 3:
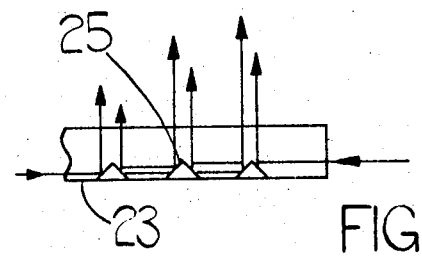

In the accompanying drawings, which illustrate one example of the invention,

FIG. 1 is a sectional view of a fault display unit incorporated in a fault display system when in use on a vehicle, FIG. 2 is a plan view of a unit shown in FIG. 1 when a fault has occured in the cooling system of the vehicle, and, FIG. 3 is a sectional view to an enlarged scale of part of the unit shown in FIG. 1.

Referring to the drawings, a fault display unit 11 is incorporated together with a control unit 12 in a fault display system. The unit 11 includes a substantially tubular casing 13 which is closed at one end by a backing plate 14 and partly closed at its other end by a window 15. The casing 13 is formed at its ends with a pair of integral outwardly directed peripheral flanges 16,17 respectively, the casing being secured by way of the flange 16 to the plate 14 and by way of the flange 17 to one side of a panel 18 of a road vehicle. The casing 13 is secured to the panel 18 at the side of the panel 18 remote from the driver of the vehicle so that the window 15 is visible in an aperture 19 in the panel.

Supported within the casing 13 is a first tubular carrier member 21 and a second tubular carrier member 22. The carrier member 21 is provided with a plurality of pairs of axially spaced slots, each pair of slots being formed at diametrically opposite sides respectively of the member 21 and each receiving the ends respectively of a translucent display panel 23 so as to support the display panels in parallel, spaced relationship with the window 15. The carrier member 22 is also provided with a plurality of pairs of slots which are arranged to coincide with the slots in the member 21, each of the slots in the member 22 receiving one end of an optical cable 24. The optical cables 24 provide means, in use, for illuminating the display panels 23 respectively with each display panel being illuminated by light from an optical cable positioned at each end thereof.

Each of the panels 23 is formed in its surface remote from the window 15 with a plurality of indentations 25 (FIG. 3) arranged so as to define a legend 26. Each of the indentations 25 is of generally triangular cross section and each of the sloping sides of the indentations are highly polished so as to be capable of reflecting some of the light issuing from their respective optical cables 24, in use, towards the window 15 to produce an image of the respective legend 26 in the window 15.

The control unit 12 includes a plurality of bulbs 27 each positioned adjacent the ends of a pair of optical cables 24 remote from their respective display panels 23. Thus when a bulb 27 is energised the bulb illuminates its respective pair of optical cables 24 which in turn illuminate their respective display panels 23 so as to produce an image of the legend 26 carried by the display panel 23 in the window 15. The arrangement of the control unit 12 when mounted in a road vehicle is such that the bulbs 27 are normally de-energised and only when a fault occurs during operation of the vehicle is a bulb energised. Each bulb is arranged to be energised when a different fault occurs and also the legends 26 are arranged so that when a fault does occur and a bulb 27 is energised then the display panel 23 which is illuminated carries a legend representative of the fault. Thus, for example, as shown in FIG. 2, if there is a fault in the cooling system of the vehicle then a panel 23 carrying the legend COOLANT is illuminated and an image of this legend is produced in the window 15 so as to provide a warning of the fault to the driver of the vehicle.

It is preferable that some means is included for improving the images of the legends 26 carried by the display panels 23 respectively positioned remote from the window 15, such as for example by arranging that each of the display panels is of a different colour or alternatively by arranging that the degree of illumination of the panels increases with the distance of the panel from the lens 15. Further it is preferable that the system includes means for catering with more than one fault at a time, such as for example, by incorporating a system of preferential illumination whereby the most important fault is indicated first, the remaining fault or faults being illuminated in turn when the first fault is rectified. Alternatively the control unit 11 could incorporate a system whereby when a number of faults occur the bulbs 27 which are to be illuminated are energised one after another in a cyclic arrangement.

I claim:

1. A fault display unit for a vehicle, including a casing having an aperture at one end thereof, a plurality of translucent display panels mounted in the casing in parallel, spaced relationship with said one end of the casing, and a plurality of optical cables associated with said display panels respectively, one end of each optical cable being positioned adjacent a respective display panel so that light from the optical cable, in use, illuminates the display panel, each of said display panels being formed with a plurality of indentations in the surface thereof remote from the aperture in the casing, and each of said indentations including a surface for reflecting some of the light from a respective optical cable, in use, towards said aperture in the casing, the indentations in each display panel being arranged to define a legend so that when a display panel is illuminated an image of the respective legend is produced in the aperture.

2. A unit as claimed in claim 1 in which each display panel is illuminated in use by a pair of optical cables positioned at their one end at opposite sides respectively of the display panel.

3. A unit as claimed in claim 1 in which each of the display panels is of a different colour.

4. A unit as claimed in claim 1 in which the degree of illumination of the panels increases with the distance of the panel from the aperture in the casing.

5. A fault display system incorporating a fault display unit as claimed in claim 1 and further including a control unit for controlling illumination of the optical cables in use, the system being arranged so that when a fault occurs in the vehicle in use one of said plurality of optical cables is illuminated whereby a respective display panel is also illuminated and an image of the legend carried by the display panel is produced in said aperture so as to give warning of the fault to the driver of the vehicle.

6. A system as claimed in claim 5 including means for preferentially illuminating selected display panels so that the most important fault is indicated first in the event of more than one fault occurring simultaneously.

7. A system as claimed in claim 5 including means for illuminating the display panels cyclically, so that during each cycle each fault is indicated.

* * * * *